United States Patent [19]

Yoshioka

[11] Patent Number: 4,998,169

[45] Date of Patent: Mar. 5, 1991

[54] FLAT-PANEL DISPLAY UNIT FOR DISPLAYING IMAGE DATA FROM PERSONAL COMPUTER OR THE LIKE

[75] Inventor: Kazuo Yoshioka, Nagasaki, Japan

[73] Assignee: Mitsubishi Denki Kabushiki Kaisha, Tokyo, Japan

[21] Appl. No.: 348,757

[22] Filed: Apr. 6, 1989

Related U.S. Application Data

[63] Continuation-in-part of Ser. No. 122,810, Nov. 19, 1987, abandoned.

[30] Foreign Application Priority Data

Nov. 21, 1986 [JP] Japan ............................ 61-279086

[51] Int. Cl.[5] ............................ H04N 5/04

[52] U.S. Cl. ............................ 358/148; 358/150

[58] Field of Search ............... 358/148, 149, 150, 158, 358/17, 19; 390/814

[56] References Cited

U.S. PATENT DOCUMENTS 4,059,842 11/1977 Meacham ............................ 358/150
4,517,587 5/1985 Aizawa et al. ............................ 358/19
4,864,399 9/1989 Romesburg et al. ............... 358/158

FOREIGN PATENT DOCUMENTS 0146529 12/1978 Japan ............................ 358/148

*Primary Examiner*—James J. Groody
*Assistant Examiner*—David E. Harvey
*Attorney, Agent, or Firm*—Sughrue, Mion, Zinn, Macpeak & Seas

[57] ABSTRACT

A flat-panel display unit including a basic clock pulse generator which produces a basic clock pulse having an oscillation frequency equal to an integer multiple of a dot clock-pulse frequency of the image data signal. The flat-panel display unit also includes a horizontal synchronizing signal detector which converts an input horizontal synchronizing signal to a pulse synchronous with the basic clock pulse, and a dot clock pulse generator which divides the basic clock pulse into clock pulses having a period equal to the dot clock pulses of the image data signal using an output of the horizontal synchronizing signal detector as a synchronous reset signal. The image data signal is sampled using the output of the sampling clock pulse generator.

6 Claims, 3 Drawing Sheets

FLAT-PANEL DISPLAY UNIT FOR DISPLAYING IMAGE DATA FROM PERSONAL COMPUTER OR THE LIKE

BACKGROUND OF THE INVENTION

This invention relates to a flat-panel display unit which is connected to equipment such as a personal computer which generates image information through digital processing, and more particularly to a flat-panel display unit which samples an image data signal from equipment such as a personal computer and stores the sampled data in an image memory.

It is a recent trend that a display unit having a flat display screen, e.g., a liquid crystal panel or an EL (electroluminescent) panel, is used in connection with a personal computer or the like. In such flat-panel display units, it is necessary to decrease the cycle of driving the display screen to obtain sufficient contrast. However, the scanning period of display signals sent from a personal computer is not always coincident with the scanning period of the display unit. To decrease the duty cycle, the display unit can be divided into two areas, i.e., upper and lower areas, which are driven separately. Accordingly, when the display unit receives image data for one picture to be displayed, which data is outputted from the personal computer, the image data are divided into two parts, i.e., upper area data and lower area data to be scanned respectively in the upper and lower areas. As a result, the scanning period of the signal from the personal computer is not coincident with the scanning period of the display unit.

Thus, it is necessary to carry out conversion of the scanning period by some appropriate means, and conversion of the scanning period is usually carried out using an image memory. To be more specific, in the display unit, an image data signal is sampled, then stored in the image memory, and read out with the read-out timing being adjusted to the scanning timing of the display unit.

Each different model of personal computer or the like generally has its own unique dot clock pulse rate, image data being sent to the associated display unit synchronized with the dot clock pulse. Accordingly, in order to sample the image data in the display unit, it is required to sample the image data with a sampling clock pulse synchronized with the dot clock pulse from the personal computer or the like. If synchronization is not achieved, the quality of the displayed image becomes low due to drop-out or doubling of the data to be displayed.

In addition, a sampling clock pulse generator for generating a sampling clock pulse for sampling the data signal is provided. It is conventional to use a generator such as that shown in FIG. 1, which is disclosed in a publication entitled "Digital Technology in Broadcasting" (published by Japan Broadcasting Publishing Co., Ltd.. on Dec. 20, 1982, pages 164–165).

In FIG. 1, reference numeral 31 denotes a phase comparator; 32 denotes a voltage-controlled oscillator (VCO); 33 denotes a divider; 11 denotes a synchronizing signal and 14 denotes a sampling clock pulse for sampling an image data signal. Given that the period of the horizontal synchronizing signal is 800 times the period of the dot clock pulse, the sampling clock pulse 14, which is an output of the VCO 32, is divided in frequency by a factor of 1/800 by the divider 33, then is inputted to the phase comparator 31, and a phase difference between it and the horizontal synchronizing signal is detected. The VCO 32 is controlled so as to reduce the phase difference by the output of the phase comparator 31 and, as a result, a sampling clock pulse 14, synchronized with the horizontal synchronizing signal 11 is generated. This method is the so-called PLL (phase-locked-loop) method.

The PLL method is widely used to obtain a signal synchronous with an external signal, but the signal produced using this method is very sensitive to variations in external factors such as ambient temperature, ambient noise, etc. Accordingly, a problem exists in that disturbances of the oscillating frequency, phase jitter and the like can occur easily due to unlocking of the loop, which results in drop-out or doubling of the data on the display screen of the display unit.

FIG. 2 is a view explaining how the above problem occurs. Under the normal operation of the sampling clock pulse generator, the N-th image data 15 are supposed to be sampled by the rising edge of the N-th sampling clock pulse 14 as shown in the drawing, and the N+1-th image data 15 are sampled by rising edge of the N+1-th pulse 14. However, in the event that the N-th pulse is dislocated or shifted to a position shown by the broken line due to variations in external factors as described above, the N+1-th data 15 are sampled instead of the N-th image data, and consequently the N-th image data 15 are not sampled at all. As a result, problems such as drop-out are manifested on the display screen of the display unit.

SUMMARY OF THE INVENTION

Accordingly, an object of the present invention is to provide a flat-panel display unit in which, regardless of variations in external factors such as ambient temperature and ambient noise, a stable sampling clock pulse for sampling an image data signal is obtained to thus obtain a high display quality and good reliability of the image display unit.

In order to accomplish the foregoing object, a flat-panel display unit according to the invention comprises a basic clock pulse generator which produces a basic clock pulse having an oscillating frequency equal to an integer times the frequency of a dot clock pulse produced by external equipment such as a personal computer, a horizontal synchronizing signal detector which converts a horizontal synchronizing signal to a pulse synchronized with the basic clock pulse, and a sampling clock pulse generator which divides the basic clock pulse using an output of the horizontal synchronizing signal detector as a synchronizing reset signal, so that the image data signal is sampled by the output of the sampling clock pulse generator.

DESCRIPTION OF THE PREFERRED EMBODIMENTS

Referring now to the accompanying drawings, a preferred embodiment of a flat-panel display unit according to the present invention will now be described in detail.

Figure 3:
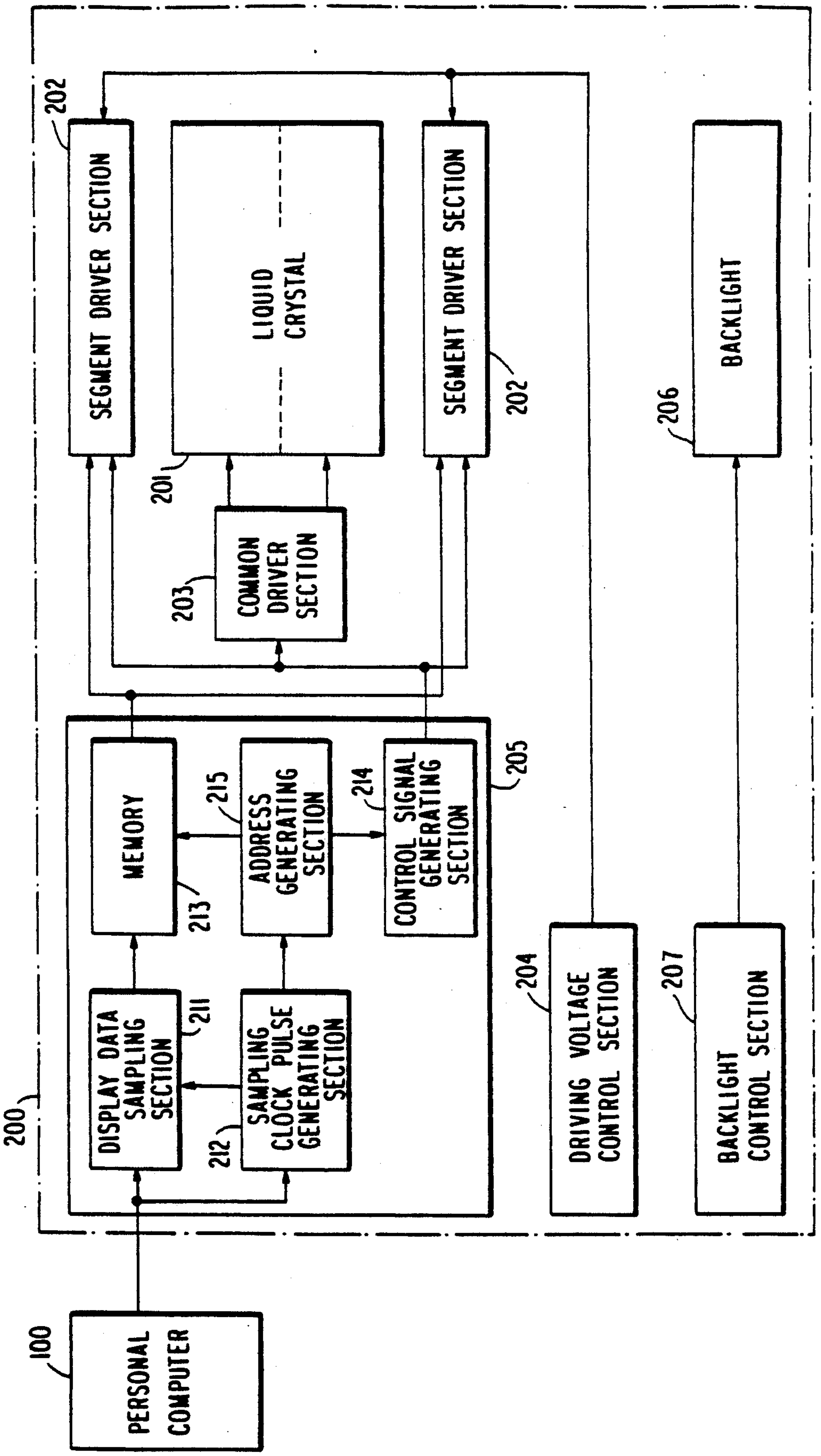
FIG. 3 is a block diagram showing an essential part of an embodiment of a flat-panel display unit to which the present invention is applied.

FIG. 3 shows an example of the flat-panel display unit according to the invention. In this embodiment, a personal computer 100 which generates image information and a liquid crystal display unit 200 (hereinafter, "flat-panel display unit") which serves as an image display unit are shown.

Various signals such as an image data signal, a horizontal synchronizing signal, etc., necessary for image display are sent from the personal computer 100 to the flat-panel display unit 200. The flat-panel display unit 200 has a construction as shown in FIG. 3. That is, in FIG. 3, a liquid crystal panel 201 serving as a display screen is driven by the output from segment driver sections 202 and a common driver section 203. The segment driver sections 202 and the common driver section 203 both generate driving voltages of a waveform appropriate for driving the liquid crystal. A driving voltage control section 204 generates driving voltages of five various potentials necessary for driving the liquid crystal panel 201. A signal processing section 205 samples an image data signal sent from the personal computer 100, writes the sampled data in a memory, and reads out the data from the memory according to scanning conditions of the liquid crystal panel 201. It further sends the data to the segment driver sections 202, and sends control signals to the segment drive sections 202 and the common driver section 203. The signal processing unit 205 essentially includes an image data sampling section 211 which samples the image data signal sent from the personal computer 100 by an output of a sampling clock pulse generating section 212. The signal processing unit 205 also includes a sampling clock pulse generating section 212 which generates a clock pulse for sampling the image data signal according to the horizontal synchronizing signal from the personal computer 100, a memory 213 in which the image data sampled by the image data sampling section 211 are stored, a control signal generating section 214 which supplies drive control signals to the segment driver sections 202 and the common driver section 203, and an address generating section 215 which generates address signals for the memory 213 and the control signal generating section 214. A backlight 206, which may be a fluorescent discharge tube, for example, is controlled by the output of a backlight control section 207.

Figure 1:
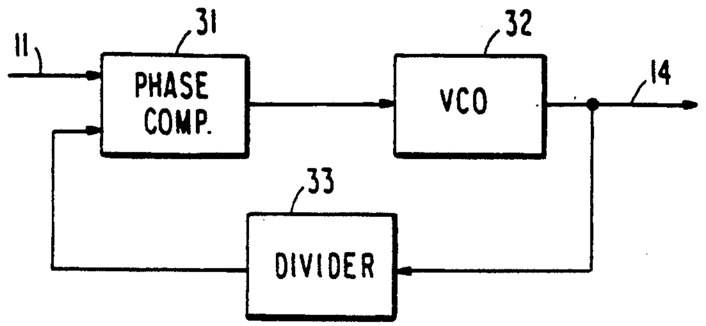
FIG. 1 PRIOR ART
FIG. 1 is a block diagram showing a sampling clock pulse generator constructed according to the prior art.
Figure 2:
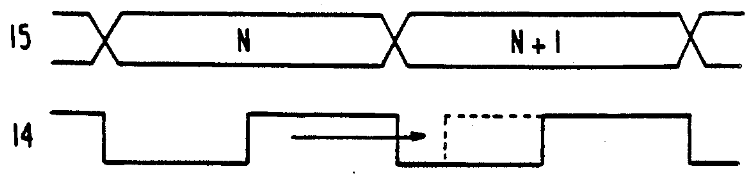
FIG. 2 is a timing chart used to explain problems of the prior art device shown in FIG. 1.
Figure 4:
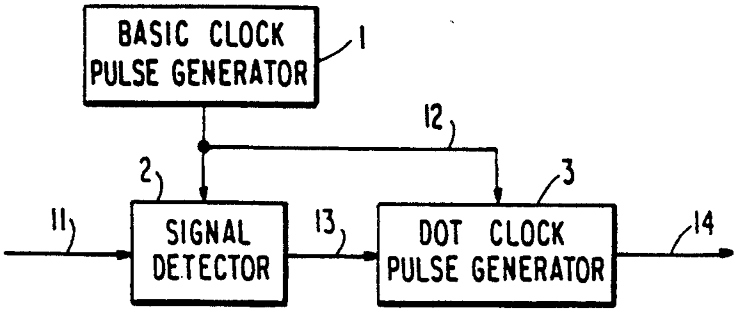
FIG. 4 is a block diagram showing an embodiment of a sampling clock pulse generator according to the invention.

FIG. 4 shows an embodiment of a device according to the invention which can be used in the sampling clock pulse generating section 212 in FIG. 3. In FIG. 4, a basic clock pulse generator 1 generates a basic clock pulse having an oscillating frequency equal to an integer times the frequency of the dot clock pulse of the personal computer 100. The basic clock pulse generator 1 includes a crystal oscillator, for example, which oscillates at a stable frequency regardless of variations in external factors such as ambient temperature. A horizontal synchronizing signal detector 2 converts a horizontal synchronizing signal 11 received from the personal computer 100 as shown in FIG. 3 to a pulse which is synchronous with the basic clock pulse 12 from the basic clock pulse generator 1. A sampling clock pulse generator 3 generates a sampling clock pulse 14 by dividing the basic clock pulse 12 sent from the basic clock pulse generator 1 synchronously with the detection output 13 of the horizontal synchronizing signal detector 2.

Figure 5:
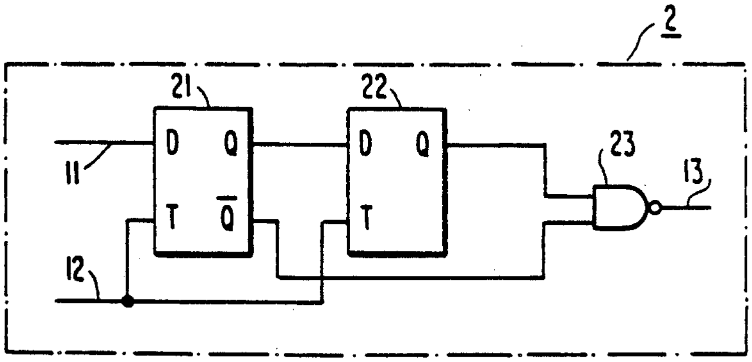
FIG. 5 is a circuit diagram of a horizontal synchronizing signal detector according to the embodiment shown in FIG. 4.

The horizontal synchronizing signal detector 2 shown in FIG. 4 is formed by a circuit shown in FIG. 5, for example. The horizontal synchronizing signal 11 is inputted to the D terminal of a D-type flip-flop 21, and the basic clock pulse 12 is inputted to the T terminal thereof. The Q output of the flip-flop 22 is inputted to the D terminal of a second D-type flip-flop 21, and the Q output of the flip-flop 22 and the $\overline{Q}$ output of the flip-flop 21 are inputted to a NAND gate 23.

Figure 6:
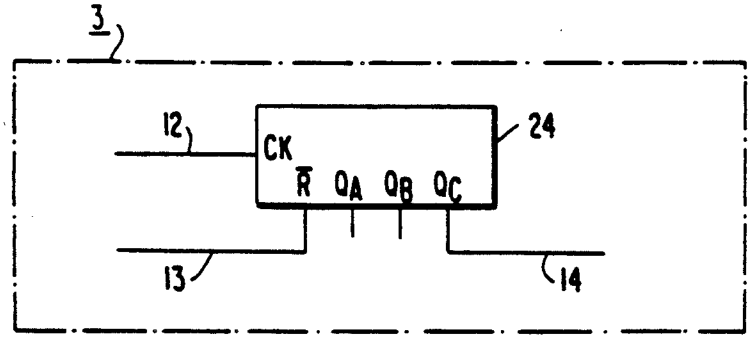
FIG. 6 is a circuit diagram of a sampling clock pulse generator according to the embodiment shown in FIG. 4.

The sampling clock pulse generator 3 shown in FIG. 4 includes a counter 24 with a synchronous reset function, as indicated in FIG. 6, for example. The basic clock pulse 12 is inputted to the clock input terminal CK of the counter 24, and a detection output 13 of the horizontal synchronizing signal detector 2 is inputted to the synchronizing reset input terminal $\overline{R}$. The sampling clock pulse 14 obtained by frequency-dividing the basic clock pulse 12 is sent from an output terminal QC. A semiconductor IC such as a fully synchronous presettable four-bit binary counter (type M74LS163 manufactured by Mitsubishi Electric Corporation) is used as the counter 24, for example.

The operation of the above device will now be described.

Figure 7:
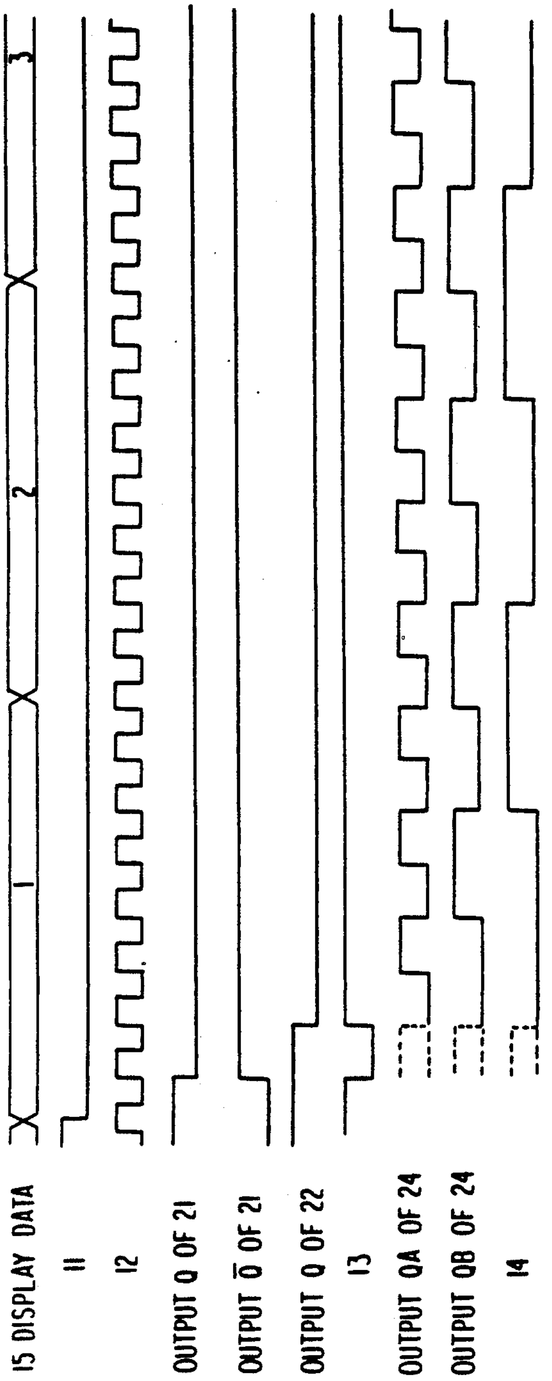
FIG. 7 and FIGS. 8A and 8B are timing charts of waveforms used to explain the operation of the embodiment shown in FIG. 4.

The basic clock pulse generator 1 generates the basic clock pulse 12 having a frequency equal to an integer (K) times (eight times in this embodiment) the frequency of the dot clock pulse with which the image data signal 15 is sent synchronously from the personal computer 100. The horizontal synchronizing signal detector 2 receives the basic clock pulse 12 and differentiates the horizontal synchronizing signal 11. That is to say, as shown in FIG. 7, the output of the Q terminal of the flip-flop 21 is changed to "L", while the output of the $\overline{Q}$ terminal is changed to "H" at the rising edge of the basic clock pulse 12 after the change of the horizontal synchronizing signal 11 to "L". Further, as the Q output of the D-flip-flop 22 is then "H", the output 13 of the NAND gate 23 is changed to "L". When the next basic clock pulse 12 is inputted to the T terminal thereafter, the Q output of the D-flip-flop 22 is changed to "L" and the output 13 of the NAND gate 23 is changed to "H". In this manner, the horizontal synchronizing signal 11 is synchronized with the basic clock pulse 12, and is converted to the pulse output 13 corresponding to one period of the basic clock pulse 12.

As the basic clock pulse 12 from the basic clock pulse generator 1 is inputted to the clock input terminal CK of the counter 24 and the pulse output 13 from the horizontal synchronizing signal detector 2 is inputted to the synchronizing reset input terminal $\overline{R}$, the sampling clock pulse generator 3 divides the basic clock pulse into 1/K (K equals eight in this embodiment) synchronously with the pulse output 13 and sends the sampling clock pulse 14 having a frequency equal to the dot clock pulse frequency as shown in FIG. 7 from the output terminal QC.

Figure 8A:
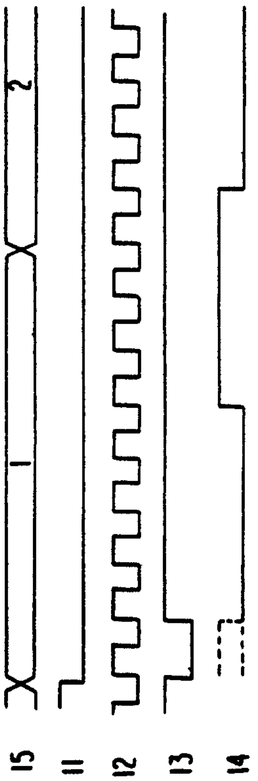
Figure 8B:
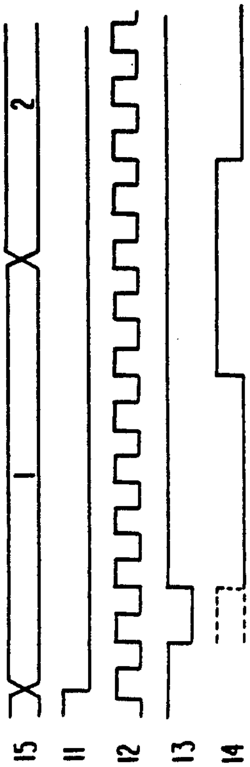

It is usual that the image data signal 15 and the horizontal synchronizing signal 11 are synchronously sent by the personal computer 100. Accordingly, the sampling clock pulse 14, rising several clock pulse periods (five pulse periods in this embodiment) from the falling edge of the output pulse 13 of the horizontal synchronizing signal detector 2, is supposed to rise substantially at the middle point of the dot period of the image data signal 15. In this connection, the sampling clock pulse varies principally due to a phase difference between the basic clock pulse 12 and the horizontal synchronizing signal 11. Such variations, however, are not more than one period of the basic clock pulse 12, and therefore even when such phase difference occurs, the image data signal 15 is exactly sampled by the sampling clock pulse 14 without omission, as is shown comparatively in FIGS. 8A and 8B.

In this image data sampling section 211 of the flat-panel display unit 200, the image data signal 15 is sampled by the sampling clock pulse 14 generated by the sampling clock pulse generator 212 as described above. (A further description of the manner of control in displaying the image data sampled by the image data sampling section on the display screen is omitted herein since such is per se well known in the art.)

As has been described above, according to the invention, since the sampling clock pulse is generated by dividing the basic clock pulse, which has a frequency equal to an integer times the frequency of the dot clock pulse of the equipment such as a personal computer and is supplied from a stable oscillation source synchronously with the horizontal synchronizing signal, it becomes possible to perform stable sampling of the image data at all times without being affected by variations in external factors, thereby improving the display quality and the reliability of the flat-panel display unit as compared with the prior art.

The circuitry of the horizontal synchronizing signal detector 2 and the sampling clock pulse generator 3, both being incorporated in the device according to the invention, is not limited to that shown in FIGS. 5 and 6. Further, the frequency of the basic clock pulse 12 is illustratively eight times the dot frequency of the image data signal 15 in the foregoing embodiment, but the multiple factor is not limited thereto. Furthermore, a personal computer is used as the equipment for generating image information and a liquid crystal display unit is used as an image display unit in the foregoing embodiment, but the invention is also not limited to such use.

What is claimed is:

1. A flat-panel display unit for displaying image data outputted from equipment such as a personal computer, said flat-panel display unit comprising:

a basic clock pulse generator for generating a basic clock pulse having an oscillating frequency equal to an integer multiple of a frequency of a dot clock pulse with which said equipment outputs image data synchronously;

a horizontal synchronizing signal detector, which receives an input horizontal synchronous signal from said equipment and said basic clock pulse, for converting said input horizontal synchronizing signal into a synchronized horizontal synchronizing signal synchronous with said basic clock pulse;

a sampling clock pulse generator, which receives said basic clock pulse and said synchronized horizontal synchronizing signal for dividing said basic clock pulse and outputting a sampling clock pulse synchronous with said horizontal synchronizing signal; and means for sampling said image data with said sampling clock pulse;

memory means for storing sampled output image data received from said sampling means;

a flat panel display; and means for reading data stored in said memory means and applying said data to said flat panel display for display thereon.

2. The flat-panel display unit according to claim 1, wherein said horizontal synchronizing signal detector comprises means for differentiating said horizontal synchronizing signal with said basic clock pulse.

3. The flat-panel display unit according to claim 2, said input horizontal synchronizing signal is converted to a pulse which is synchronous with said basic clock pulse and which has a period corresponding to one period of said basic clock pulse.

4. The flat-panel display unit according to claim 1, wherein said horizontal synchronizing signal detector comprises a first D-type flip-flop having a data input terminal to which said input horizontal synchronizing signal is applied and a trigger terminal to which said basic clock pulse is applied, a second D-type flip-flop having a data input terminal to which an output of said first D-type flip-flop is applied and a trigger terminal to which said basic clock pulse is applied, and a NAND gate to which an output of said second D-type flip-flop and a complementary output of said first D-type flip-flop are applied.

5. The flat-panel display unit according to claim 1, wherein said sampling clock pulse generator comprises a counter having a synchronizing reset function for generating at an output terminal of said counter said sampling clock pulse having a frequency equal to that of said dot clock pulse by inputting said basic clock pulse to a clock input terminal of said counter and an output of said horizontal synchronizing signal detector to a reset input terminal of said counter.

6. The flat-panel display unit according to claim 1, wherein said basic clock pulse generator comprises a crystal oscillator.

* * * * *